US008707314B2

(12) United States Patent
Gummaraju et al.

(10) Patent No.: US 8,707,314 B2
(45) Date of Patent: Apr. 22, 2014

(54) SCHEDULING COMPUTE KERNEL WORKGROUPS TO HETEROGENEOUS PROCESSORS BASED ON HISTORICAL PROCESSOR EXECUTION TIMES AND UTILIZATIONS

(75) Inventors: Jayanth Gummaraju, San Francisco, CA (US); Nuwan S. Jayasena, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 292 days.

(21) Appl. No.: 13/328,404

(22) Filed: Dec. 16, 2011

(65) Prior Publication Data

US 2013/0160016 A1 Jun. 20, 2013

(51) Int. Cl.
*G06F 9/46* (2006.01)
*G06F 9/50* (2006.01)

(52) U.S. Cl.
USPC .......................................... 718/102; 718/104

(58) Field of Classification Search
None
See application file for complete search history.

(56) References Cited

U.S. PATENT DOCUMENTS

| 7,203,944 | B1 | 4/2007 | Van Rietschote et al. | |
|---|---|---|---|---|
| 2007/0294666 | A1* | 12/2007 | Papakipos et al. | 717/119 |
| 2007/0294696 | A1* | 12/2007 | Papakipos et al. | 718/102 |
| 2008/0276261 | A1* | 11/2008 | Munshi et al. | 719/328 |
| 2008/0276262 | A1* | 11/2008 | Munshi et al. | 719/328 |
| 2009/0307704 | A1* | 12/2009 | Munshi et al. | 718/104 |
| 2011/0022817 | A1* | 1/2011 | Gaster et al. | 711/202 |
| 2011/0173155 | A1* | 7/2011 | Becchi et al. | 707/610 |
| 2011/0258413 | A1 | 10/2011 | Cho et al. | |
| 2012/0144162 | A1* | 6/2012 | Papakipos et al. | 712/200 |
| 2012/0159464 | A1* | 6/2012 | Demetriou et al. | 717/148 |
| 2012/0180030 | A1* | 7/2012 | Crutchfield et al. | 717/149 |
| 2012/0194526 | A1* | 8/2012 | Sander et al. | 345/503 |
| 2012/0291040 | A1* | 11/2012 | Breternitz et al. | 718/104 |
| 2013/0007774 | A1* | 1/2013 | Munshi et al. | 719/328 |
| 2013/0055272 | A1* | 2/2013 | Munshi et al. | 718/102 |
| 2013/0081066 | A1* | 3/2013 | Munshi et al. | 719/328 |
| 2013/0132934 | A1* | 5/2013 | Munshi et al. | 717/149 |
| 2013/0141447 | A1* | 6/2013 | Hartog et al. | 345/522 |

OTHER PUBLICATIONS

International Search Report and Written Opinion for International Application No. PCT/US2012/069857, European Patent Office, Netherlands, mailed on Mar. 14, 2013.

* cited by examiner

*Primary Examiner* — Meng An
*Assistant Examiner* — Benjamin Wu
(74) *Attorney, Agent, or Firm* — Sterne, Kessler, Goldstein & Fox P.L.L.C.

(57) ABSTRACT

A system and method embodiments for optimally allocating compute kernels to different types of processors, such as CPUs and GPUs, in a heterogeneous computer system are disclosed. These include comparing a kernel profile of a compute kernel to respective processor profiles of a plurality of processors in a heterogeneous computer system, selecting at least one processor from the plurality of processors based upon the comparing, and scheduling the compute kernel for execution in the selected at least one processor.

20 Claims, 9 Drawing Sheets

US 8,707,314 B2

SCHEDULING COMPUTE KERNEL WORKGROUPS TO HETEROGENEOUS PROCESSORS BASED ON HISTORICAL PROCESSOR EXECUTION TIMES AND UTILIZATIONS

BACKGROUND OF THE INVENTION

1. Field of the Invention

The present invention relates generally to heterogeneous computer systems.

2. Background Art

Computers and other such data processing devices have at least one control processor that is generally known as a central processing unit (CPU). Such computers and processing devices can also have other processors such as graphics processing units (GPU) that are used for specialized processing of various types. For example, GPUs are designed to be particularly suited for graphics processing operations. GPUs generally comprise multiple processing elements that are ideally suited for executing the same instruction in parallel on different data streams, such as in data-parallel processing. A GPU can comprise, for example, a graphics processor unit, a graphics processor, a graphics processing core, a graphics processing device, or the like. In general, a CPU functions as the host or controlling processor and hands-off specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs and GPUs can be part of the same die (e.g., AMD Fusion™) or on different dies (e.g., Intel Xeon™ with NVIDIA GPU). Recently, programming systems (e.g., OpenCL) have been introduced for General Purpose GPU (GPGPU) style computing to execute non-graphics applications on GPUs. The GPGPU style of computing advocates using the CPU to primarily execute control code and to off-load performance critical data-parallel code to the GPU. The GPU is primarily used as an accelerator. However, some GPGPU programming systems allow the use of both CPU cores and GPU cores as accelerator targets.

Several frameworks have been developed for heterogeneous computing platforms that have CPUs and GPUs. These frameworks include BrookGPU by Stanford University, CUDA by NVIDIA, and OpenCL by an industry consortium named Khronos Group. The OpenCL framework offers a C-like development environment using which users can create applications for GPU. OpenCL enables the user, for example, to specify instructions for offloading some computations, such as data-parallel computations, to a GPU. OpenCL also provides a compiler and a runtime environment in which code can be compiled and executed within a heterogeneous computing system.

Frameworks such as OpenCL, at present, require the programmer to determine what parts of the application(s) are executed on the CPUs and the GPUs of the heterogeneous system. Determining this split, however, is not trivial as GPUs and CPUs spanning a broad spectrum of performance characteristics are available on the market and can be mixed and matched in a given system. In addition, the available resources on the system at runtime may vary depending on other applications executing on the same system. Therefore, application programmers are faced with implementing elaborate, complex, dynamic schemes for allocating multiple kernels to processors within their applications or settling for sub-optimal performance.

BRIEF SUMMARY OF EMBODIMENTS OF THE INVENTION

System and method embodiments for optimally allocating compute kernels to different types of processors, such as CPUs and GPUs, in a heterogeneous computer system are disclosed. Embodiments use profiles that characterize kernels and processors in order to determine an optimal allocation of the kernels to the processors. Embodiments include comparing a kernel profile of a compute kernel to respective processor profiles of a plurality of processors in a heterogeneous computer system, selecting at least one processor from the plurality of processors based upon the comparing, and scheduling the compute kernel for execution in the selected at least one processor.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

Figure 1:
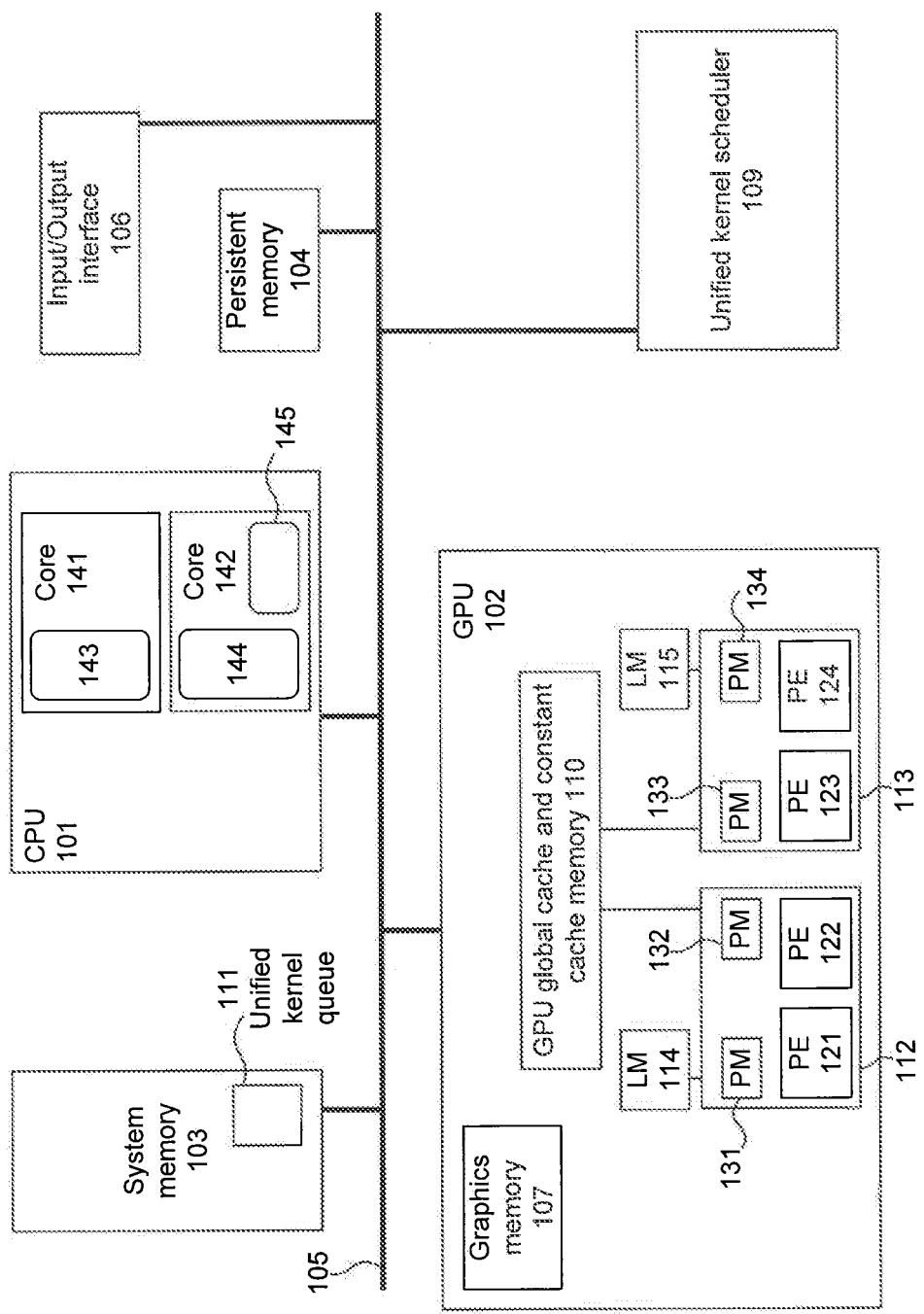
FIG. 1 shows a heterogeneous computing system, according to an embodiment of the present invention.

Embodiments of the present invention yield substantial advantages by automatically allocating compute kernels to different types of processors in a heterogeneous computing system in order to optimize performance and/or power consumption. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using two or more processors. The present invention is particularly useful where the system comprises a heterogeneous computing system. A "heterogeneous computing system," as the term is used herein, is a computing system in which multiple types of processors are available. The multiple types of processors can include, for example, CPUs and GPUs.

A "compute kernel", as used in this disclosure, refers to a kernel that can be executed in processors of more than one processor type available in a heterogeneous computing system. A kernel is a function containing instructions declared in a program and executed on one or more data items using one or more processors in a heterogeneous computer system. Kernels are sometimes also referred to by other terms such as shaders, shader programs, or programs. According to an embodiment, a compute kernel may have the same code base to be executed on different processor types, such as GPUs and CPUs.

Embodiments of the present invention reduce or eliminate the burden imposed upon the programmer to determine what parts of the application(s) are executed on the CPUs and the GPUs of the heterogeneous system. The determination of what parts of the application are executed in each type of processor is difficult for the programmer for reasons including the large variation in available processors and runtime variations in processor capacities. By automatically allocating compute kernels to processors selected based upon processor characteristics and characteristics of the kernels, embodiments of the present invention seek to optimize the allocation of the compute kernels among the different types of processors in the heterogeneous system. The characteristics of the kernels and processors may be determined using static and dynamic analysis of the system conditions. The optimization of the allocation of compute kernels to processors may be based on one or more of power consumption considerations and performance considerations. The allocation may initially be based upon an initial determination of compute kernel characteristics and processor characteristics, and may be adjusted based upon dynamic situations in the heterogeneous computer system during runtime. The resulting allocations may be optimal in terms of the compute operations per watt of power consumed (e.g., floating point operations per second per watt or FLOPS/watt).

Embodiments of the present invention enables a heterogeneous computing system that can, in response to variations in workload and/or available processors, optimally allocate and/or re-allocate the workload among available processors in order to ensure optimal performance and/or energy consumption.

A Heterogeneous Computing System

An example heterogeneous computing system 100 is shown in FIG. 1, according to an embodiment of the present invention. Heterogeneous computing system 100 can include one or more CPUs, such as CPU 101, and one or more GPUs, such as GPU 102. Heterogeneous computing system 100 can also include at least one system memory 103, at least one persistent storage device 104, at least one system bus 105, at least one input/output device 106, and a unified kernel scheduler 109.

CPU 101 can include any commercially available control processor or a custom control processor. CPU 101, for example, executes control logic that controls the operation of heterogeneous computing system 100. CPU 101 can be a multi-core CPU, such as a multi-core CPU with two CPU cores 141 and 142. CPU 101, in addition to any control circuitry, can include CPU cache memory such as the cache memories 143 and 144 of CPU cores 141 and 142, respectively. CPU cache memories 143 and 144 can be used to temporarily hold instructions and/or parameter values during the execution of an application on CPU cores 141 and 142, respectively. For example, CPU cache memory 143 can be used to temporarily hold one or more control logic instructions, values of variables, or values of constant parameters, from the system memory 103 during the execution of control logic instructions on CPU core 141. In some embodiments, CPU 101 can also include specialized vector instruction processing units. For example, CPU core 142 can include a Streaming SIMD Extensions (SSE) unit that can efficiently process vectored instructions. A person skilled in the art will understand that CPU 101 can include more or less than the CPU cores in the example chosen, and can also have either no cache memories, or more complex cache memory hierarchies.

GPU 102 can include any commercially available graphics processor or custom designed graphics processor. GPU 102, for example, can execute specialized code for selected functions. In general, GPU 102 can be used to execute graphics functions such as graphics pipeline computations such as geometric computations and rendering of image on a display. In general, GPU 102 may be preferred for the execution of data-parallel code.

GPU 102 can include a GPU global cache memory 110 and one or more compute units 112 and 113. A graphics memory 107 can be included in or coupled to GPU 102. Each compute unit 112 and 113 may be associated with a GPU local memory 114 and 115, respectively. Each compute unit includes one or more GPU processing elements (PE). For example, compute unit 112 includes GPU processing elements 121 and 122, and compute unit 113 includes GPU processing elements 123 and 124. Each GPU processing element 121, 122, 123, and 124, may be associated with registers and/or private memory (PM) 131, 132, 133, and 134, respectively. Each GPU processing element can include one or more of a scalar and vector floating-point units. The GPU processing elements can also include special purpose units such as inverse-square root units and sine/cosine units. GPU global cache memory 110 can be coupled to a system memory such as system memory 103, and/or graphics memory such as graphics memory 107.

System memory 103 can include at least one non-persistent memory such as dynamic random access memory (DRAM). System memory 103 can hold processing logic instructions, constant values and variable values during execution of portions of applications or other processing logic. For example, in one embodiment, the control logic and/or other processing logic of unified kernel scheduler 109 can reside within system memory 103 during execution of unified kernel scheduler 109 by CPU 101. The term "processing logic," as used herein, refers to control flow instructions, instructions for performing computations, and instructions for associated access to resources.

Persistent memory 104 includes one or more storage devices capable of storing digital data such as magnetic disk, optical disk, or flash memory. Persistent memory 104 can, for example, store at least parts of instruction logic of unified kernel scheduler 109. For example, at the startup of heterogeneous computing system 100, the operating system and other application software can be loaded in to system memory 103 from persistent storage 104.

System bus 105 can include a Peripheral Component interconnect (PCI) bus, Advanced Microcontroller Bus Architecture (AMBA) bus, Industry Standard Architecture (ISA) bus, or other such industry-standard or proprietary device. System bus 105 can also include a network such as a local area network (LAN). System bus 105 may also be an on-chip bus or other on-chip interconnection network in systems where multiple heterogeneous processing units (e.g. CPU and GPU cores) are integrated on a single die or chip. System bus 105 may also comprise a hierarchy of busses or interconnection networks such that processing cores within a chip are interconnected via on-chip mechanisms and multiple such chips are interconnected via off-chip mechanisms. System bus 105 includes the functionality to couple components including components of heterogeneous computing system 100.

Input/output interface 106 includes one or more interfaces connecting user input/output devices such as keyboard, mouse, display and/or touch screen. For example, user input can be provided through a keyboard and mouse connected through user interface 106 to heterogeneous computing system 100. The output of heterogeneous computing system 100, such as the output of processing performed on CPU 101 and/or CPU 102, can be output to a display through user interface 106.

Graphics memory 107 is coupled to system bus 105 and to GPU 102. Graphics memory 107 is, in general, used to hold data transferred from system memory 103 for first access by the CPU. For example, the interface between CPU 102 and graphics memory 107 can be several times faster than the system bus interface 105.

Unified kernel scheduler 109 operates to schedule functions and processing logic on one more types of processors available in heterogeneous computing system 100. Unified kernel scheduler 109 may schedule compute kernels from a unified queue Iii. Unified queue 111 may be configured in system memory 103. The kernels scheduled by the unified kernel scheduler 109 may be executable on one or more types of processors in the heterogeneous system. Some kernels may execute the same code on different types of processors. For some other kernels, the programmer specified source code may be enhanced during compilation as necessary to execute on the different types of processors. Unified kernel scheduler 109 is further described in relation to FIG. 2 below. Unified kernel scheduler 109 can be implemented using software, firmware, hardware, or any combination thereof. When implemented in software, for example, unified kernel scheduler 109 can be a computer program, that when compiled and executing resides in system memory 103. In source code form and/or compiled executable form, unified kernel scheduler 109 can be stored in persistent memory 104 or other computer readable storage medium. In one embodiment, some or all of the functionality of unified kernel scheduler 109 is specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing system 100 can include more or less components that shown in FIG. 1. For example, heterogeneous computing system 100 can include one or more network interfaces, and or software applications such as the OpenCL framework.

Compute kernels may include data-parallel kernels and task-parallel kernels. In general, CPUs are better suited to execute task-parallel kernels, whereas data-parallel kernels are better suited for GPU execution. Both CPUs and GPUs can execute multiple instances of a compute kernel in parallel. Each instance of an executing compute kernel may be referred to as a "workitem." In GPU 102, for example, workitems may simultaneously execute on each processing element 121, 122, 123, and 124. The workitems assigned to a compute unit for parallel execution may be referred to as a "workgroup."

Unified Kernel Scheduler

Figure 2:
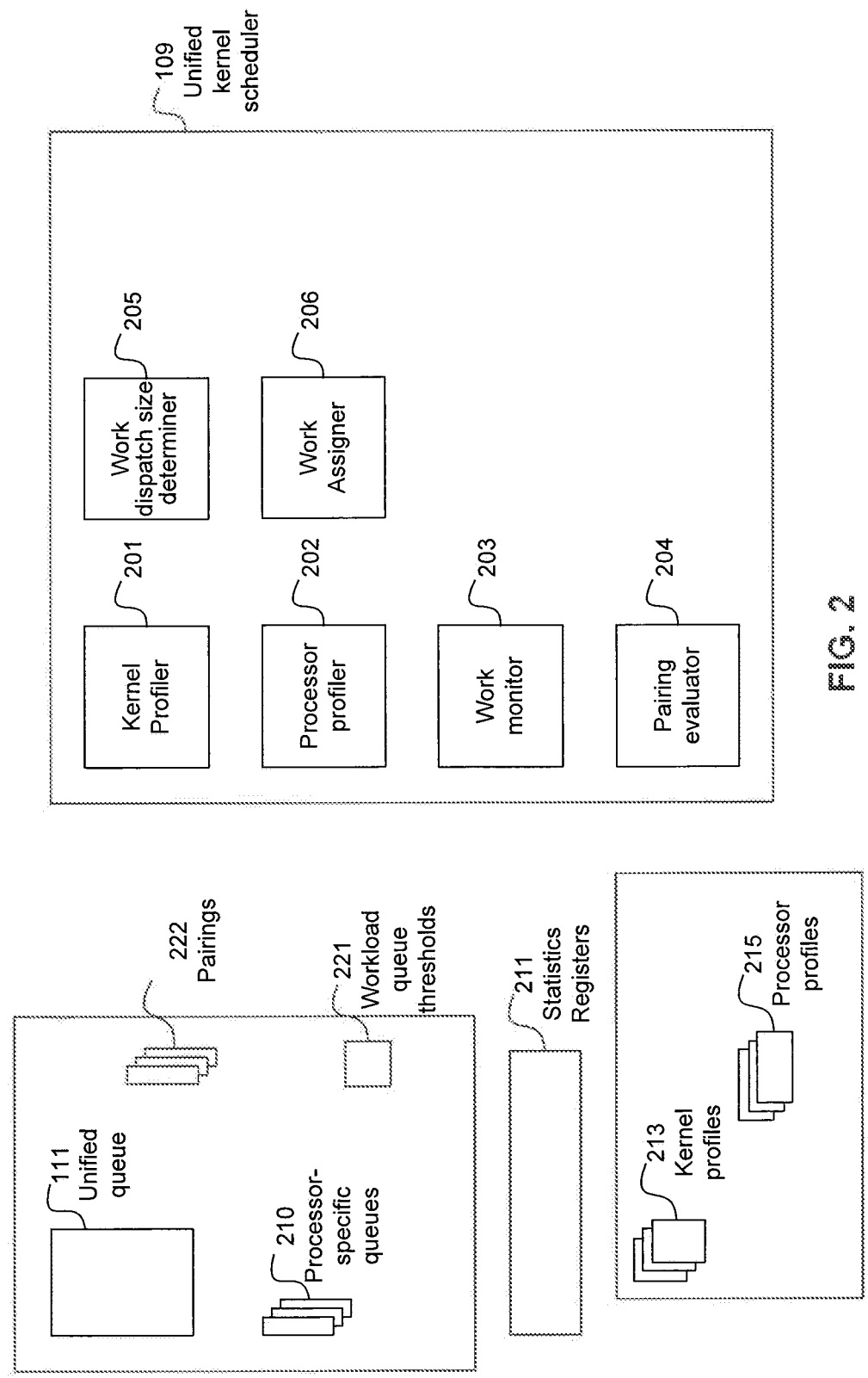
FIG. 2 shows a unified kernel scheduler and other components of the heterogeneous computing system of FIG. 1, according to an embodiment of the present invention.

FIG. 2 illustrates unified kernel scheduler 109 and several related components, according to an embodiment of the present invention. Unified kernel scheduler 109 can comprise a kernel profiler 201, a processor profiler 202, a work monitor 203, a pairing evaluator 204, work dispatch size determiner 205, and work assigner 206. Persons of skill in the art will appreciate that unified kernel scheduler 109 can comprise additional components and/or different combinations of components 201-206.

Kernel profiler 201 operates to generate and maintain kernel profiles 213. Kernel profiler may include functionality to analyze code, such as OpenCL code, and identify code fragments that can be advantageously scheduled for execution in a CPU or alternatively on a GPU. Kernel profiler 201 can determine characteristics of a kernel being analyzed according to one or more metrics. The characterization of the kernel with regard to the analysis of these one or more characteristics is then recorded as the particular kernel's "signature" or "profile." The initial kernel profiles may be generated at compile-time based upon static characteristics, and may be refined subsequently during system operation based upon dynamically determined characteristics. The assessed characteristics for kernels may include metrics quantifying the ratio of compute operations to memory access operation, degree of nesting and prevalence of conditional branching, prevalence of synchronization operations, memory latency tolerance (both in terms of load-to-use delay within a single thread and the number of threads available to switch to hide memory access delay), and use of specialized instructions, and/or features that are available only on some processors. Additionally, information such as the proximity of the data required by a kernel to respective processors may be part of the characterization of that kernel. Based upon the analysis of the kernels, a kernel profile 213 is generated for each kernel and stored in a memory, such as, one or more of a system memory 103, and processor-specific memory 107.

Processor profiler 202 operates to generate a signature or profile for processors available for computing in a heterogeneous computing system. The profiles for the processors are referred to herein as "processor profiles" 215. The processors may be characterized based upon metrics quantifying factors such as compute throughput, memory bandwidth, memory access latency, dispatch roundtrip time, CPU to GPU bandwidth, control flow capability, and synchronization throughput. The characterization of processors may be performed at the time of installation and/or at instances when the hardware is reconfigured.

Work monitor 203 operates to monitor the compute kernels during runtime. Dynamic information such as executing time, consumed energy, compute unit utilization, bandwidth utilization, number of stall cycles due to memory access latencies, total number of stall cycles, and conditional branch divergence can be obtained by monitoring kernels during execution. The monitoring may be based on hardware, firmware, and/or software based performance counters 211. The number and types of performance counters 211 being monitored may be balanced against the overhead incurred in such monitoring so as not to unduly burden the operation of the computing system. The monitoring may be performed at configured periodic intervals or continuous sampling.

Pairing evaluator 204 operates to determine the best matching pairs comprising a compute kernel and a processor in which to execute the compute kernel. The match is determined based upon the signatures of the compute kernel and the processor. According to an embodiment, pairing evaluator 204 attempts to pair the highest performance underutilized processor with the best matching execution-ready compute kernel. Each pairing may be evaluated using an estimated performance measure and/or an estimated consumed energy measure (also referred to as a power consumption measure). According to an embodiment, during execution of heterogeneous computer 100, the pairings 222 may be stored in system memory 103.

Work dispatch size determiner 205 operates to determine the number of instances of a compute kernel allocated to each different processor. The determined size may be one or both, the workgroup size and the number of workgroups scheduled at a time. The allocation may be changed based upon performance and/or power consumption criteria determined from monitoring execution of the compute threads in the different types of processors. This change in allocation may affect the later parts of a kernel's dispatch (based on measurements on the execution of early parts of the same kernel dispatch) or subsequent invocations of the kernel (based on measurements from the full execution of prior one or more invocations of the same kernel).

Work assigner 206 operates to schedule compute kernels to processors and to adjust the assignment based on performance and/or other criteria. Work assigner 206 can dequeue execution-ready compute kernels from a unified queue 111 and enqueue the compute kernels to respective processor-specific queues 210.

Unified kernel queue 111 may comprise one or more comprises a single queue into which application programs place kernels to be executed. An embodiment of this invention may pick compute kernels from that queue for execution on one or more processors or types of processors in the heterogeneous computing system. Processor-specific queues 210 may be specific to one or more processors of a particular type. According to an embodiment, compute kernels may be assigned to processors when work assigner 206 is triggered to dequeue a compute kernel from unified queue 111. The triggering maybe based upon placement of new kernels in unified queue 111 or a workload queue threshold 221 in one or more processor-specific queues 210 indicating that the particular queue(s) have reached a configured threshold indicating that the corresponding one or more processors are available to be assigned kernels for processing.

Mapping and Executing Compute Kernels to Processors

Figure 3:
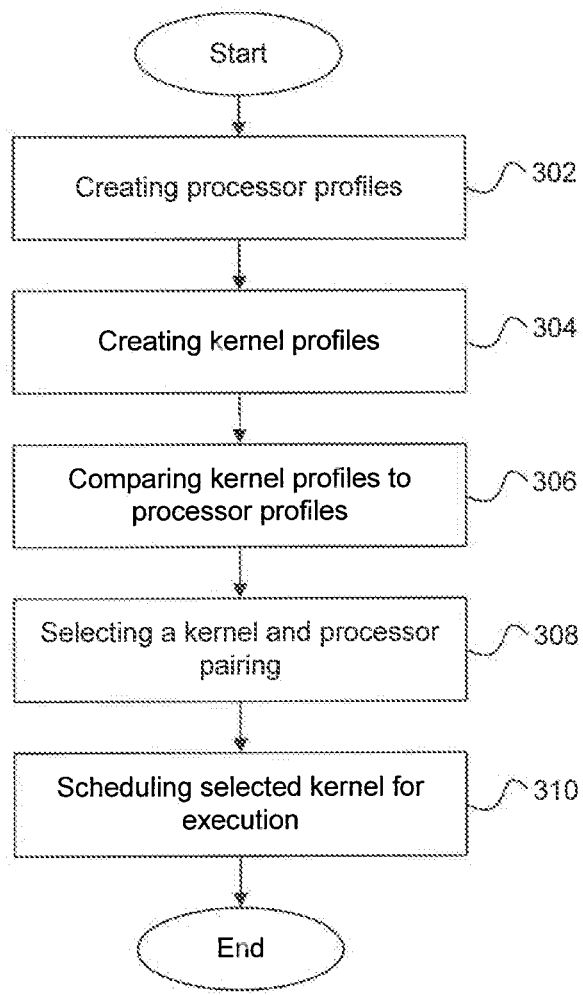
FIG. 3 is a method for optimally allocating compute kernels to processors in a heterogeneous computing system, according to an embodiment of the present invention.

FIG. 3 shows a method 300 (operations 302-310) for allocating compute kernels in a heterogeneous computing system in accordance with an embodiment of the present invention. Method 300 can execute, for example, on heterogeneous computing system 100. In one embodiment, method 300 can represent the flow of processing logic of unified kernel scheduler 109.

Without loss of generality, the following description is primarily based on the OpenCL framework. However, embodiments of the present invention can also be implemented using other development and execution frameworks such as, but not limited to, the CUDA framework, BrookGPU framework, and the like. As described above, OpenCL provides a development environment, compiler and a runtime environment in which code can be developed, compiled and executed within a heterogeneous computing system.

OpenCL also provides built-in library functions and application programming interfaces (API) that can be called by the user applications to execute various functions, such as, deploying a compute kernel to execute in a processor. In general, OpenCL framework primarily executes on a host system and controls the operation of coupled processors by deploying commands (e.g., data transfers, kernel invocations, and other executable code including unified kernel scheduler or portions thereof) to each processor. For example, OpenCL framework may primarily execute on CPU core 141, and control the operation of GPU 102, and CPU cores 141 and 142 by deploying commands to be executed on the respective devices including compute kernels to be executed either on one or more CPUs or GPUs 102.

At operation 302, processor profiles are generated. The processor profiles may be created as a one-time process during installation, startup or initialization of the heterogeneous computing system and stored in persistent storage. The generated profiles may be updated as hardware changes occur. Hardware changes may be events, such as, for example, the addition and/or removal of a processor or memory. A profile may be created for each processor, each processor type, and/or groups of processors of different types. A processor profile of a processor or group of processors characterizes one or more hardware parameters with respect to that processor or group of processors. The characterized one or more parameters may relate to one or more of performance measures and/or energy consumption measures. The processor profiles are used to pair processors for execution with compute kernels. The generation of processor profiles is described in further detail in relation to FIG. 5 below.

At operation 304, kernel profiles are generated for compute kernels that are to be executed in the heterogeneous computing system. A profile may be created for each compute kernel to be executed. The profile may be created during installation of the application or library containing the kernel, on the first invocation of the kernel, or on each invocation of the kernel. Profiles may be stored in persistent storage for use across multiple runs of the application or re-generated on each invocation of the application or kernel. As described before, multiple instances of a compute kernel can be executed in the computing system in parallel on one or more processors. A kernel profile maybe generated for each compute kernel. The initial kernel profile may be generated based on static characteristics of the kernel code. The respective kernel profiles can be updated according to dynamic performance and/or energy consumption characteristics of the kernel during execution. The generation of kernel profiles is further described in relation to FIG. 4 below.

At operation 306, the kernel profiles are compared to processor profiles in order to find a best match processor profile and kernel profile pairing. According to an embodiment, for each compute kernel that is enqueued in a unified kernel queue, its profile is compared to profiles of underutilized processors. In another embodiment, the profiles of compute kernels may be compared to processor profiles according to a precedence order or queue discipline. For example, profiles may be selected for comparison in the order of enqueuing of the respective compute kernels.

At operation 308, a pairing of a compute kernel and processor is selected. The selected pairing may be the best match pairing in accordance with predetermined criteria. The criteria for selecting the best match may include, but is not limited to, one or more of efficiency of execution of the compute kernels and consumed power. Execution efficiency may be determined based on one or more of, execution time, processor utilization, and data transfer time. Energy efficiency may be determined based on one or more of energy consumed for execution of the compute kernels and energy consumed for transferring related data. According to an embodiment, the pairing which yields the most desirable value in a weighted sum of an execution efficiency measure and an energy efficiency measure is determined to be the best match pairing. A single kernel may also generate multiple pairings with multiple processors in which case the execution of that kernel may be split across multiple processors or processor types.

At operation 310, according to the selected pairing, the compute kernel is scheduled for execution in the selected one or more processor. Scheduling the compute kernel for execution may include determining the number of instances of the compute kernel to execute on the selected processor. The number of instances may be determined based upon several factors such as, but not limited to, the current utilization of the selected processor, and compute and memory requirements of the kernel. If the selected processor is a CPU, factors such as, the number of cores available, processor speed, current utilization, may be considered in determining the number of instances of the compute kernel to be deployed on the processor. If the selected processor is a GPU, factors, such as, the number of compute units, and the number of kernels that can execute in parallel in each compute unit, can be considered in determining the number of instances to be deployed. If a kernel with pairings for multiple processors is scheduled across more than one processor, distribution of the kernel's instances (workitems and workgroups) among those processors may be based on the relative merits of the pairings as characterized by the weighted sum of efficiency described above.

Figure 4:
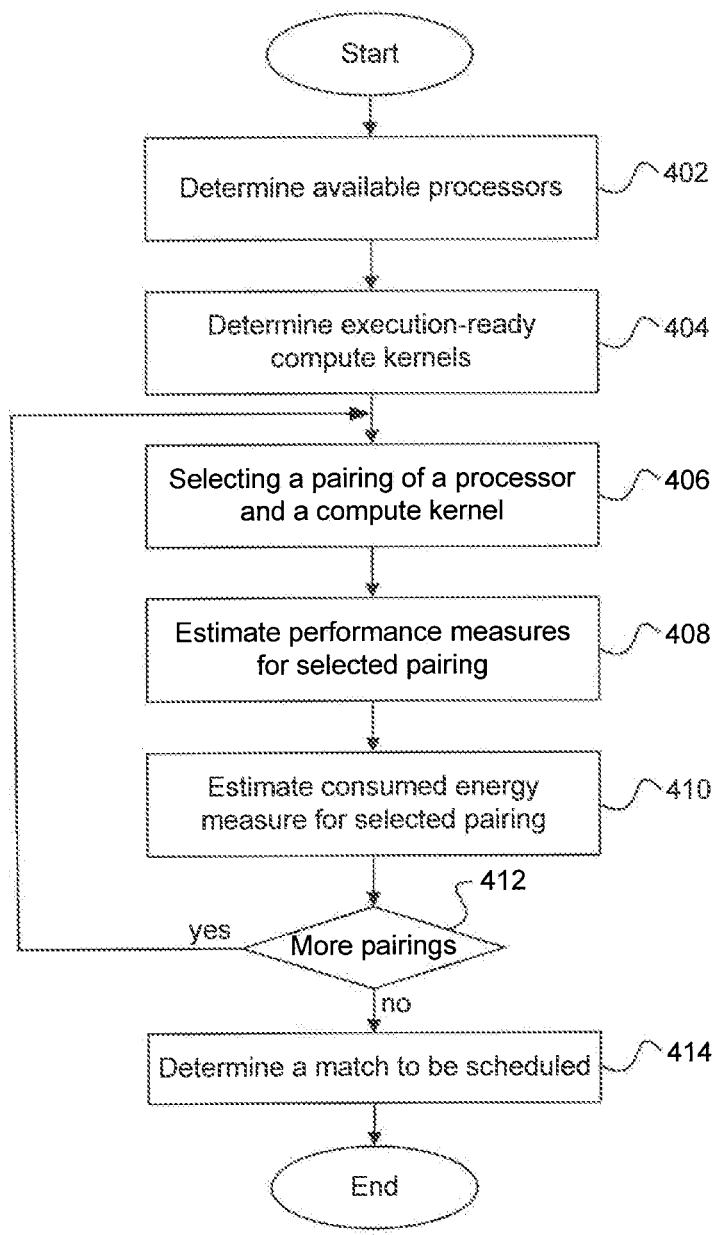
FIG. 4 is a method of comparing available processors and execution-ready compute kernels in accordance with the present invention.

FIG. 4 illustrates a flowchart of a method 400 (operations 402-414) for selecting a pairing of a processor and a compute kernel to be executed. According to an embodiment, method 400 may be used in performing operations 306 and 308 of method 300.

At operation 402, the available processors are determined The available processors may be processors that are underutilized. A utilization threshold may be used to determine whether the current utilization and/or utilization of the processor over a time interval is below the utilization threshold. The utilization threshold, based upon which a processor can be considered to be underutilized, may configured or may be determined based upon dynamic evaluation of runtime conditions. According to an embodiment, the four processors with the highest underutilization can be selected to be considered as available processors. Any number of processors from the processors available in the heterogeneous computing system can be considered as available processors. In another embodiment, all processors in the system may be considered available regardless of their utilization levels at the time. A tradeoff may exist between the number of processors considered as available, and the overhead incurred in evaluating a larger number of processors. For example, although considering a larger pool of processors as available may improve the accuracy of the pairings, evaluating a large number of processors may incur a high cost in terms of additional processing.

At operation 404 execution-ready compute kernels are determined. According to an embodiment, execution-ready compute kernels are kernels that are currently enqueued in a unified kernel queue, such as unified kernel queue 111, from which they are selected for execution in the various processors in the heterogeneous computing system. According to another embodiment, only those kernels enqueued in the unified kernel queue that already have the input data ready may be considered as execution-ready. The determination of the readiness for execution of compute kernels may also include considering whether all other application-level dependencies for that kernel have been satisfied.

Operations 406-412 may be repeated to evaluate a plurality of pairings. At operation 406, a pairing of an available processor and a compute kernel is selected. The pairing may be selected randomly from all possible pairings. According to an embodiment, a pairing is selected from a set of pairing determined to be pairings with a high likelihood of becoming the pairing that is actually scheduled. For example, when pairings of highly data-parallel compute kernels and a highly parallel GPU are available, pairings comprising single core CPU and highly data-parallel compute kernels may be disregarded in evaluating pairs. Likewise, pairings of highly task-parallel compute kernels and GPUs may be disregarded when pairings between such task-parallel compute kernels and multi-core CPUs are available.

At operation 408, performance measures are estimated for the selected pairing. According to an embodiment, a performance measure may include a measure of the execution time and the data transfer time required to complete the execution of the selected compute kernel on the selected processor. In embodiments where many pairings are expected to be evaluated, initial pairings based on static criteria may be evaluated at the time of application installation or only on the very first invocation of the kernel and saved on persistent media for use on subsequent executions of the kernel. In such cases, operation 408 may represent reading such pre-computed evaluations for selected pairing from persistent media and possibly augmenting with dynamically computed criteria.

At operation 410, energy consumption is estimated for the selected pairing. According to an embodiment, a consumed energy measure may include a measure of the energy required for executing the compute kernels on the selected processor and a measure of the energy required for transferring the data needed for the execution. In embodiments where many pairings are expected to be evaluated, initial energy estimates may be evaluated based on static criteria at the time of application installation or only on the very first invocation of the kernel and saved on persistent media for use on subsequent executions of the kernel. In such cases, operation 410 may represent reading such pre-computed estimates for selected pairing from persistent media and possibly augmenting with dynamically computed criteria.

At operation 412, it is determined whether more pairings are to be evaluated. The determination whether more pairings are to be evaluated may be based upon a static configuration or on dynamic system environment conditions. For example, if the current overall system utilization is above a threshold a fewer number of pairings may be evaluated, whereas if the utilization is lower, more pairings may be evaluated in an attempt to improve the accuracy of the allocation. Other dynamic factors to be considered may include the number of available processors, number of compute kernels to be scheduled, and a comparison of a current system efficiency measure to a desired system efficiency measure.

If more pairings are to be evaluated, processing proceeds to operation 406 to select the next pairing to be evaluated. Operations 406-412 are repeated for each respective pairing to be evaluated.

When no more pairings are to be evaluated, processing proceeds to operation 414. At operation 414, a determination is made as to which pairing is to be scheduled. In some embodiments, multiple pairings may be selected to be scheduled for the same kernel to distribute the execution of that kernel across multiple processors. According to an embodiment, a weighted measure of performance and consumed energy may be evaluated for each pairing. For example, the selected pairing or pairings may be determined based upon maximizing the sum of (1) and (2) across the entire system:

$$W_p*(ExecTime(K_i,P_j)+DataXferTime(K_i,P_j)) \quad (1)$$

$$W_e*(ExecEnergy(K_i,P_j)+DataXferEnergy(K_i,P_j)) \quad (2)$$

$W_p$ and $W_e$ are relative weightings assigned to performance and energy considerations. $W_p$ and $W_e$ may be statically configured and/or may be dynamically determined based upon current system conditions to suitably weight the selection of pairings to favor either improved performance or improved energy consumption. $ExecTime(K_i,P_j)$ is an estimate of the execution time for executing compute kernel i on processor j. $DataXferTime(K_i,P_j)$ is an estimate of the time for transferring the data for $K_i$ (e.g., inputs and outputs of $K_i$) to and/or from $P_j$ as needed. $ExecEnergy(K_i,P_j)$ is an estimate of the consumed energy for executing compute kernel i on processor j. $DataXferEnergy(Ki,Pj)$ is an estimate of the energy required for transferring the data for $K_i$ (e.g., inputs and outputs of $K_i$) to and/or from $P_j$ as needed.

Figure 5:
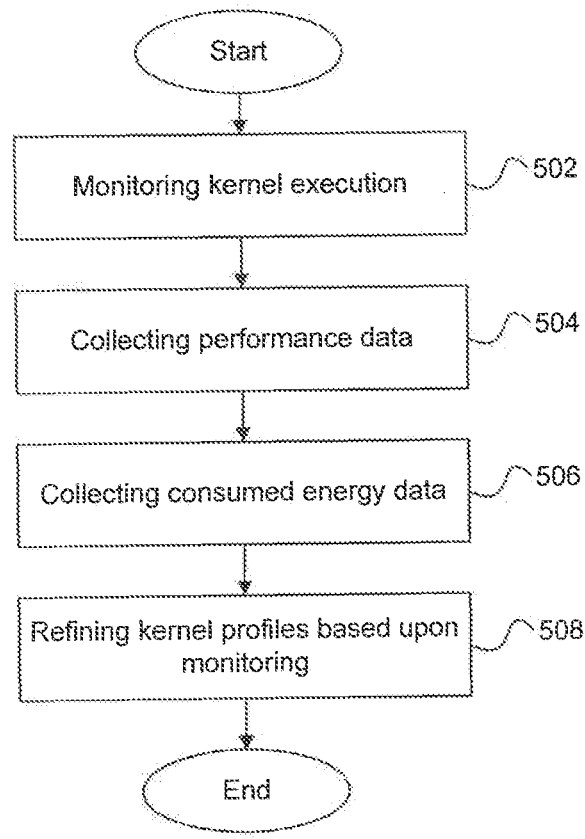
FIG. 5 is a method of dynamically refining kernel profiles in accordance with the present invention.

FIG. 5 illustrates a method 500 (operations 502-506) for refining kernel profiles, according to an embodiment. Method 500 may be used to refine the initial kernel profiles generated, for example, using method 600 described below. The initial kernel profile may be associated with a low confidence. The confidence associated with a kernel profile may be adjusted as execution continues. The confidence may be adjusted, for example, based upon the number of invocations of the compute kernel and further based upon the yielded monitoring results.

At operation 502, compute kernel execution is monitored. The monitoring may be based upon collecting a configurable set of statistics. The statistics may be collected separately for each of the processors on which the compute kernels execute. Statistics may be aggregated for each processor type. Statistics may be collected using hardware and/or software performance counters. As described below, various metrics are available to measure performance and/or energy consumption. The set of metrics measured and monitored may be configurable.

At operation 504, performance related statistics are evaluated. Dynamically monitored performance related statistics can include, for example, execution time, compute unit utilization, bandwidth utilization, stall cycles due to memory access latencies, total stall cycles, conditional branch divergence, cache hit/miss rates and memory system utilizations. According to an embodiment, the performance statistics are evaluated primarily based upon the execution time. Execution time can be determined, for example, based upon a timestamp counter in a CPU and/or a performance counter in a GPU.

At operation 506, consumed energy statistics are evaluated. Consumed energy may be measured by monitoring the energy consumed during execution as reported in registers associated with the respective processors and memory controllers. Moreover, consumed energy may be estimated using power consumption specifications (e.g., average CPU power utilization) and actual operations, such as floating point operations and integer operations, executed upon the respective processors.

At operation 508, the kernel profile is refined in accordance with the evaluated performance statistics and consumed energy statistics. As the dynamic monitoring of performance and consumed energy proceeds, the level of confidence associated with the kernel profile is increased if the monitored statistics are consistent with the profile. When the monitoring is inconsistent with the current kernel profile, the profile is refined to be consistent with the new monitoring statistics, and its associated confidence is reduced. The confidence associated with a kernel profile, according to an embodiment, is increased by a Configurable increment corresponding to each monitoring interval that yields statistics consistent with the current kernel profile. The confidence may also be lowered by a configurable decrement whenever a monitoring interval yields statistics that are inconsistent with the current kernel profile. It should be noted that measurements that are inconsistent with the current profile may also be a result of an application phase change.

Figure 6:
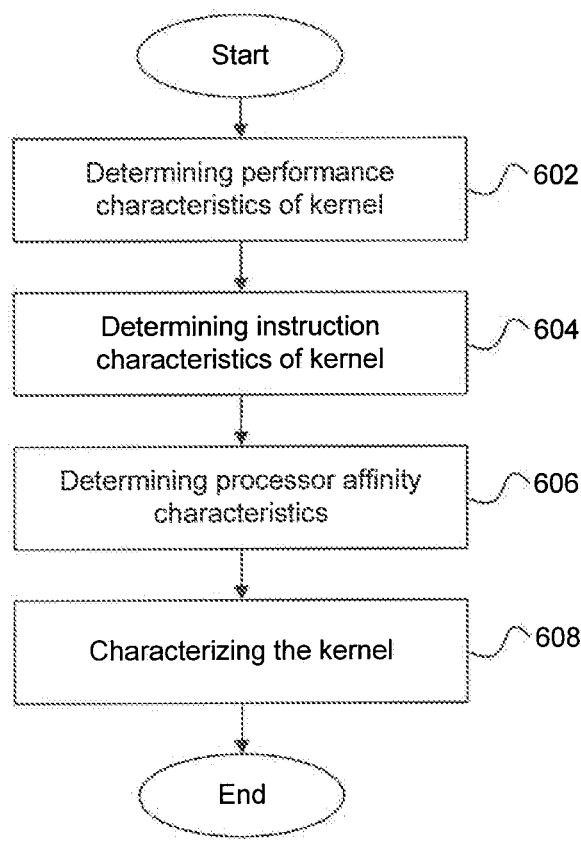
FIG. 6 is a method of generating the initial kernel profiles in accordance with the present invention.

FIG. 6 illustrates a method 600 (operations 602-608) for generating the initial profile for a compute kernel.

At operation 602, performance characteristics of the compute kernel are determined. Determined performance characteristics can include, for example, ratio of compute to memory access operations, prevalence of conditional branches, degree of nesting, prevalence of synchronization operations, memory latency tolerance, etc.

At operation 604, instruction characteristics of the compute kernel are determined. Instruction characteristics can include, for example, the use of specialized instructions or features that are only available on some of the processors available in the heterogeneous computing system.

At operation 606, processor affinity for the compute kernel is determined. An affinity metric can be used to introduce a bias in favor of processors that are close to the input and output data locations of respective kernels. The degree of the bias is a function of both the size of the data input data set as well as the overhead of transferring the data to another processor. This may include both the bandwidth available between processors for the data transfer as well as the overhead of issuing the transfer operations. According to another embodiment, if the outputs of kernel $K_1$ are to be consumed by a kernel $K_2$ that has a high-confidence signature with affinity for a particular processor (or type of processor), a corresponding bias is introduced to the signature of $K_1$.

At operation 608, the compute kernel is characterized based upon the performance characteristics, instruction characteristics, and processor affinity characteristics. The characterization is saved as a kernel profile for the particular compute kernel.

Figure 7:
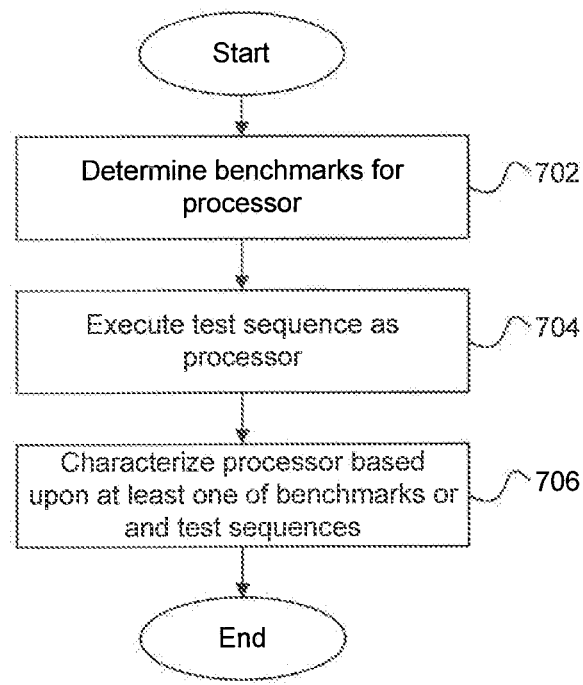
FIG. 7 is a method of generating processor profiles in accordance with an embodiment of the present invention.

FIG. 7 illustrates a method 700 (operations 702-706) for generating processor profiles, in accordance with an embodiment.

At operation 702, properties of the processor are determined. The properties may be determined based upon known information about each type of processor. For example, determined properties may include, the number of arithmetic and logic units (ALU), vector widths, register counts, known latencies, etc. These properties may be looked up from a table based upon an identification of the type of processor.

At operation 704, one or more test sequences are executed on the processor to determine performance and/or energy consumption measurements of the processor. Metrics such as compute throughput, memory bandwidth, memory latency, dispatch roundtrip time, CPU-GPU bandwidth, control flow capability, and synchronization throughput, may be measured by executing one or more predetermined test sequences on respective types of processors. Compute throughput may be measured using test sequences having known compute characteristics. Memory bandwidth and memory access latencies may be measured using test sequences with known memory access patterns. In case of processors with different memory spaces (e.g., GPUs with local and global memories, CPUs with cache memories), all or a subset of these memory spaces may be characterized separately. Dispatch roundtrip time can be measured by profiling the dispatch of a trivial kernel. The time for transferring input/output data may be specific to the type of kernel, and is therefore not included in the dispatch roundtrip time metric. CPU-GPU bandwidth can be measured by executing test sequences with known data transfer sequences. Control flow capability can be measured using test sequences with known dynamic and divergent branching characteristics. Synchronization throughput can be measured using test sequences with known synchronization behaviors.

At operation 706, each processor is characterized in accordance with one or more of the determined properties and the measurements determined based upon the one or more executed test sequences. For each metric, the system can be configured to consider either the properties determined at operation 702, or the measurements based upon executed test sequence. According to another embodiment, one or more metrics may be determined based upon a combination of the properties from published information and measurements of executed test sequences.

Figure 8:
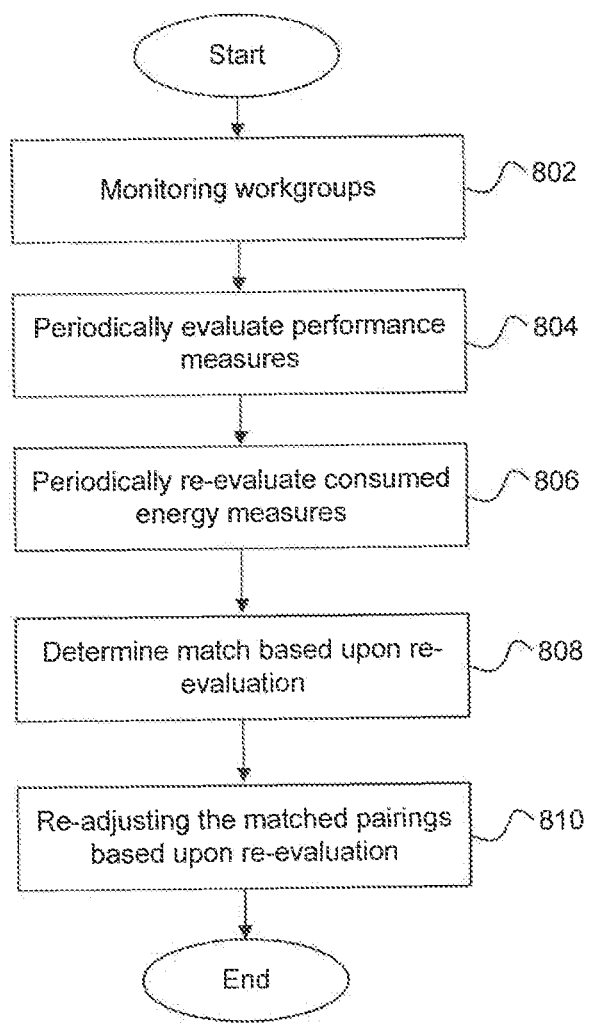
FIG. 8 is a method for dynamically re-allocating compute kernels among different types of processors in a heterogeneous system in accordance with an embodiment of the present invention.

FIG. 8 illustrates a method 800 (operations 802-810) to re-adjust workgroup allocations among processors in accordance with an embodiment. The initial number of workgroups assigned to a processor may be determined based upon primarily the characteristics of the processor. For example, each GPU may have an optimal number of concurrent workitems based upon SIMD processing capabilities, and each CPU may have an optimal number of concurrent workitems based upon the number of cores and other factors.

At operation 802, the workgroup executions are monitored. The monitoring includes collecting statistics in relation to performance and/or energy consumption.

At operation 804, performance measures are evaluated periodically.

At operation 806, consumed energy measures are evaluated periodically.

At operation 808, the current match is re-evaluated based upon the periodically evaluated performance and/or energy consumption information. Re-evaluation may include comparing the current kernel profiles to profiles at the time of one or more preceding evaluations, to determine whether a significant difference is detected. Whether a change in value in one or more of the metrics is significant may be determined based upon a configured and/or dynamically determined threshold(s).

At operation 810, the matched pairings are re-adjusted based upon the re-evaluation. The numbers of workgroups allocated may be reduced or increased in order to move an optimality measure, such as the measures based upon at least one of (1) and (2) above, towards a desired direction.

Figure 9:
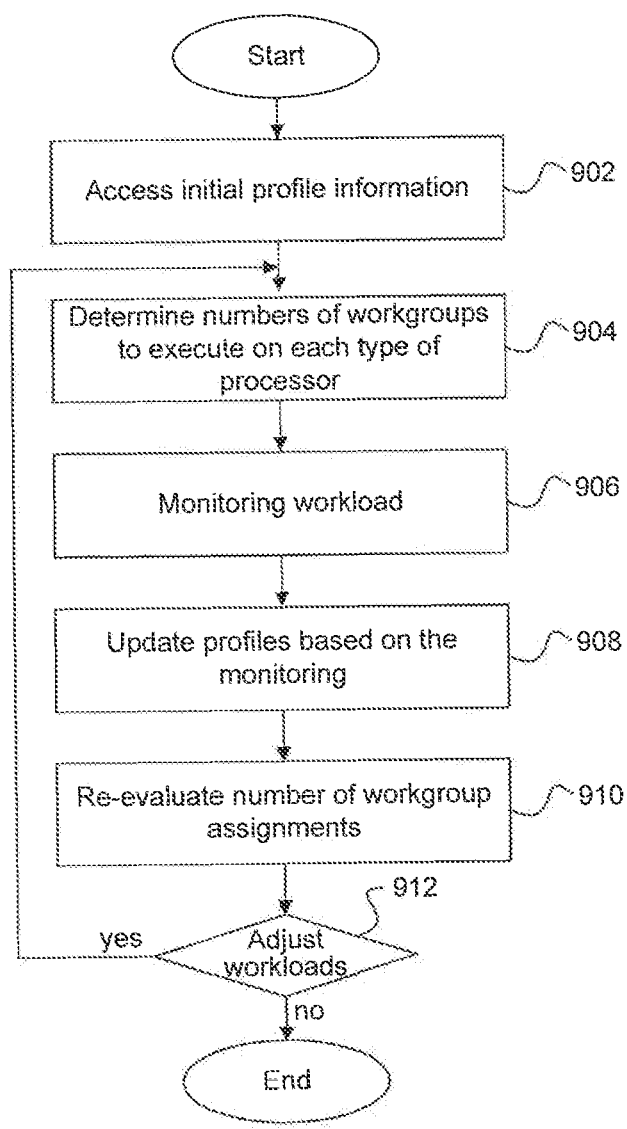
FIG. 9 is a method for dynamically adjusting work distribution in accordance with an embodiment.

FIG. 9 illustrates a method 900 (operations 902-912) for allocating and/or load balancing a compute kernel for execution among different types of processors according to an embodiment. The compute kernel may be executed as a series of workgroups. As the confidence in collected performance and/or energy consumption information increases, then a larger number of workgroups may be scheduled at a time in order to reduce the overhead of scheduling and dispatching.

At operation 902, initial profile information is accessed for processors and for the compute kernel.

At operation 904, the number of workgroups of the compute kernel to execute on each type of processor is determined. The initial number of workgroups to schedule for execution respectively on CPUs and GPUs, for example, may be configurable and may be configured to be a relatively small number (e.g., 1 for each compute unit) based on the confidence associated with the profile. As the confidence in a kernel profile increases, the number of workgroups scheduled at a time can be changed. For example, at a predetermined level of confidence the number of the workgroups scheduled at a time may be doubled up to some threshold.

At operation 906, the execution of the workloads is monitored. The execution of the workload may be monitored in terms of performance and/or consumed energy, as described above.

At operation 908, profiles are updated based upon the monitoring. The profiles, such as kernel profile, may be updated based upon the statistics determined at each monitoring interval, as described above.

At operation 910, the current workgroup assignments are re-evaluated based upon the updated profiles. The re-evaluation may include determining if there has been a change in the confidence associated with the kernel profile, and may further consider whether the current allocation of workgroups is smaller or larger than a configured threshold. The monitoring results may be evaluated based upon the results obtained in the current monitoring interval as well as historical information. The historical information for the compute kernel, for example, may indicate that a spike in a performance and/or energy consumption metric is due to a phase change in an application.

At operation 912, it is determined whether the number of workloads assigned at a time to the respective types of processors have to be re-adjusted. If "yes", then method 900 proceeds to operation 904 to determine a new assignment. If "no", method 900 proceeds to operation 906, to continue monitoring and periodic update of profiles. For example, although a spike is detected in the performance and/or energy consumption metrics, historical information may indicate that it is a short-duration application phase change and therefore no adjustment may be warranted.

Conclusion

The present invention has been described above with the aid of functional building blocks illustrating the implementation of specified functions and relationships thereof. The boundries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of executing compute kernels, comprising:
   comparing a kernel profile of a compute kernel to respective processor profiles of a plurality of processors in a heterogeneous computer system;
   determining a quantity of workgroups to schedule for execution at a time, wherein the determining is based upon current monitored workloads in the plurality of processors compared to a workload threshold and historical information, the historical information including at least one of execution times and processor utilization for each of the workgroups on processors of a first type and of a second type in the plurality of processors, and wherein each of the workgroups comprises multiple instances of an associated compute kernel configured to execute in parallel; and scheduling the workgroups for execution on one or more of the plurality of processors based on the comparing and determining.

2. The method of claim 1, further comprising:
selecting at least one processor from the plurality of processors based upon the comparing; and
scheduling the compute kernel for execution in the selected at least one processor.

3. The method of claim 2, further comprising:
generating the kernel profile during installation or compilation of the compute kernel; and
refining the kernel profile based upon dynamic information gathered during preceding executions of corresponding at least one of compute kernels or workgroups.

4. The method of claim 3, wherein generating the kernel profile comprises:
determining performance characteristics of the compute kernel; and
determining instruction characteristics of the compute kernel.

5. The method of claim 4, wherein generating the kernel profile further comprises:
determining processor affinity characteristics for the compute kernel based upon proximity of at least one of data inputs and data outputs of the compute kernel.

6. The method of claim 2, further comprising:
characterizing respective processors of the plurality of processors; and
generating the processor profiles based upon the characterizing.

7. The method of claim 6, the characterizing respective processors including:
determining at least one of a performance or capacity characteristic of a particular one of the respective processors using one or more of a configured property or a dynamically executed test on the particular processor.

8. The method of claim 2, wherein the comparing comprises:
determining available processors from the plurality of processors;
determining one or more execution-ready compute kernels from a plurality of compute kernels; and
matching respective kernel profiles of the one or more execution-ready compute kernels to respective processor profiles of the available processors.

9. The method of claim 8, wherein the matching comprises:
selecting a pairing of one of the execution-ready compute kernels and one or more of the available processors;
estimating a performance measure to execute the selected compute kernel in the selected one or more available processors; and
determining one or more matches for the selected pairing based upon the estimated performance measure.

10. The method of claim 9, wherein the matching further comprises:
estimating a consumed energy measure to execute the selected compute kernel in the selected one or more available processors; and
determining the one or more matches for the selected pairing based further upon the estimated consumed energy measure.

11. The method of claim 10, wherein the matching further comprises:
periodically re-estimating one or more of the performance measure and the consumed energy measure based upon dynamically obtained performance data of the heterogeneous computer system.

12. The method of claim 10, wherein the consumed energy measure is determined based upon at least one of an estimated energy required in executing the pairing and an estimated energy required in transferring data for the pairing.

13. The method of claim 9, wherein the performance measure is determined based upon at least one of an estimated time required in executing the pairing and an estimated time required in transferring data for the pairing.

14. The method of claim 2, wherein the scheduling comprises:
determining respective sizes of workloads for the selected compute kernel to execute in respective ones of the selected at least one processor, wherein the selected at least one processor includes a processor of a first type and a processor of a second type;
adjusting the determined respective sizes of workloads based upon historical information including dynamically measured at least one of execution times and processor utilization for respective workgroups on processors of the first type and on processors of the second type; and
scheduling the compute kernel for execution in the selected at least one processor in accordance with the adjusted determined respective sizes of workloads.

15. The method of claim 14, wherein the scheduling further comprises:
comparing current conditions of the heterogeneous computer system with the historical information;
determining a current status of the heterogeneous computer system in accordance with the comparing; and
adjusting the scheduling based upon the current status.

16. A heterogeneous computer system, comprising:
a plurality of processors including at least one processor of a first type and at least one processor of a second type;
at least one memory coupled to the plurality of processors; and
a unified kernel scheduler configured to:
compare a kernel profile of a compute kernel to respective processor profiles of the plurality of processors;
determine a quantity of workgroups to schedule for execution at a time, wherein the determining is based upon current monitored workloads in the plurality of processors compared to a workload threshold and historical information, the historical information including at least one of execution times and processor utilization for each of the workgroups on processors of the first type and of the second type in the plurality of processors, and wherein each of the workgroups comprises multiple instances of an associated compute kernel configured to execute in parallel; and
schedule the workgroups for execution on one or more of the plurality of processors based on the comparing and determining.

17. The heterogeneous computer system of claim 16, wherein the unified scheduler is further configured to:
select at least one processor from the plurality of processors based upon the comparing; and schedule the compute kernel for execution in the selected at least one processor.

18. The heterogeneous computer system of claim 17, further comprising:

a unified kernel queue configured to enqueue compute kernels; and wherein the unified scheduler is further configured to:

compare the kernel profile of the compute kernel from the unified kernel queue to respective processor profiles of the plurality of processors.

19. The heterogeneous computer system of claim 18, wherein the unified scheduler is further configured to:

determine available processors from the plurality of processors;

determine one or more execution-ready compute kernels from the plurality of compute kernels; and match respective kernel profiles of the one or more execution-ready compute kernels to respective processor profiles of the available processors.

20. A non-transitory computer readable storage medium storing commands, wherein the commands, if executed, cause a method comprising:

comparing a kernel profile of a compute kernel to respective processor profiles of a plurality of processors in a heterogeneous computer system;

determining a quantity of workgroups to schedule for execution at a time, wherein the determining is based upon current monitored workloads in the plurality of processors compared to a workload threshold and historical information, the historical information including at least one of execution times and processor utilization for each of the workgroups on processors of a first type and of a second type in the plurality of processors, and wherein each of the workgroups comprises multiple instances of an associated compute kernel configured to execute in parallel; and scheduling the workgroups for execution on one or more of the plurality of processors based on the comparing and determining.

* * * * *